E. O. CLARK.
AUTOMOBILE HEADLIGHT.
APPLICATION FILED JUNE 17, 1912.

1,047,171.

Patented Dec. 17, 1912.

3 SHEETS—SHEET 1.

WITNESSES

INVENTOR:
Edward O. Clark,
his Attorney

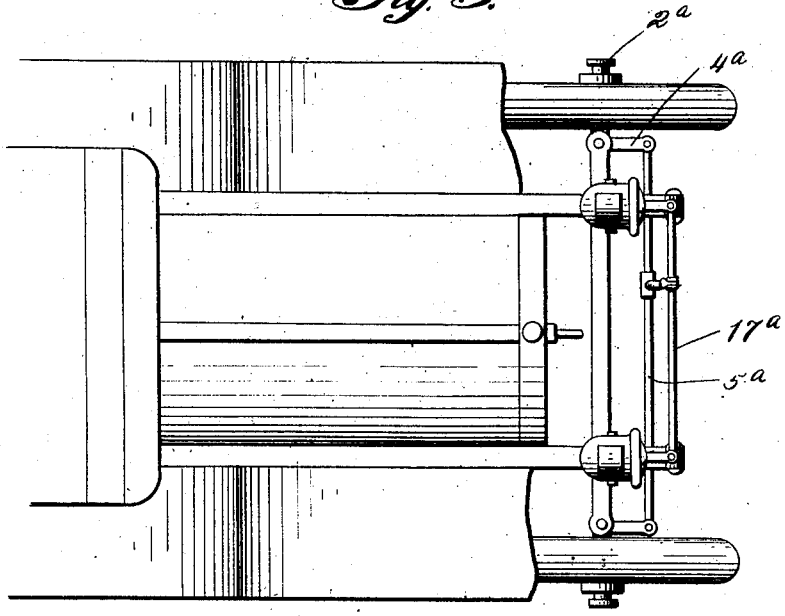
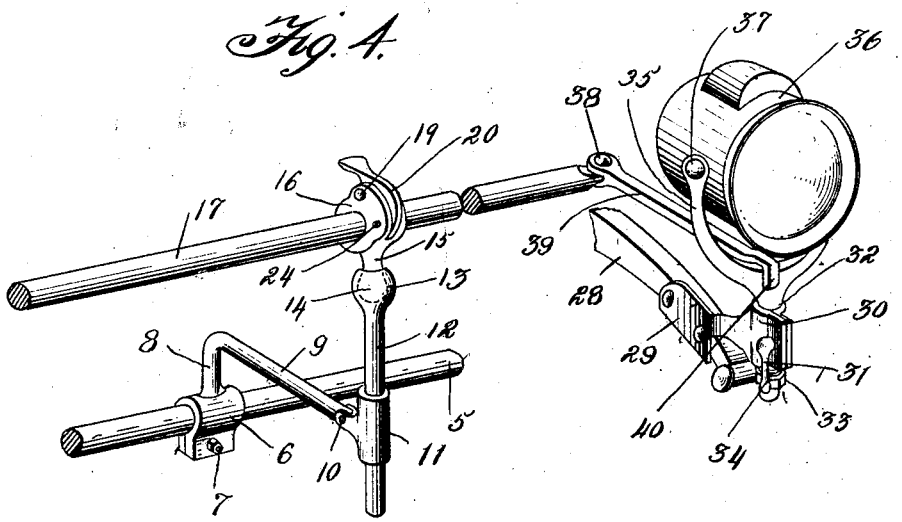

E. O. CLARK.
AUTOMOBILE HEADLIGHT.
APPLICATION FILED JUNE 17, 1912.
1,047,171.
Patented Dec. 17, 1912.
3 SHEETS—SHEET 3.
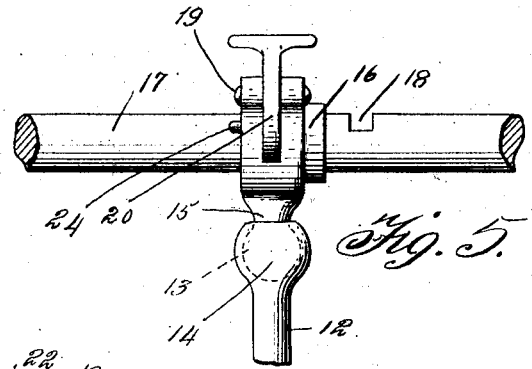
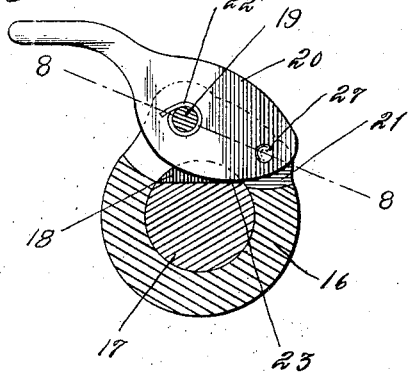
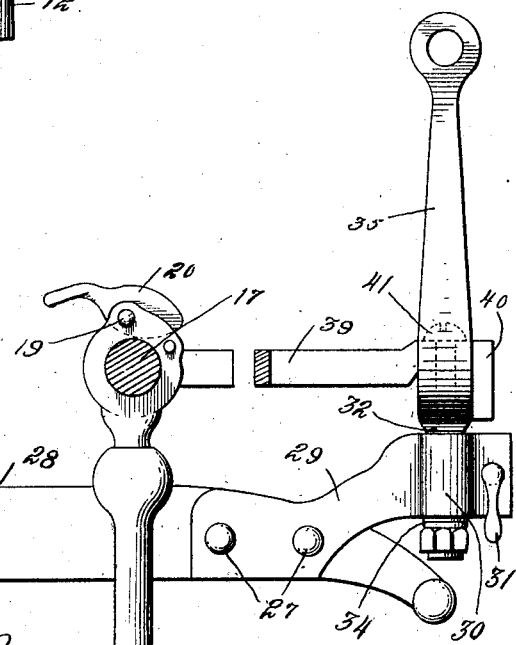
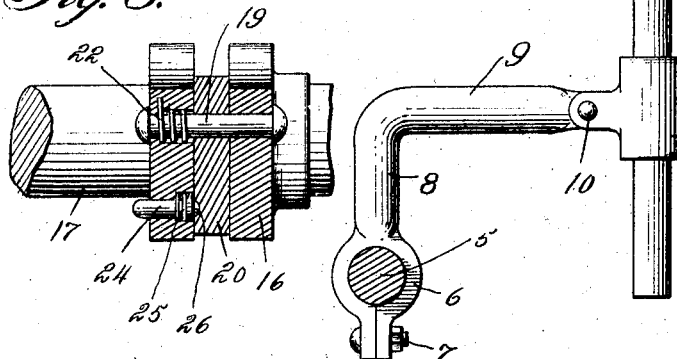
WITNESSES
INVENTOR:
Edward O. Clark.

UNITED STATES PATENT OFFICE.

EDWARD O. CLARK, OF SPOKANE, WASHINGTON, ASSIGNOR OF ONE-THIRD TO EDWARD A. MOYE, OF SPOKANE, WASHINGTON.

AUTOMOBILE-HEADLIGHT.

1,047,171. Specification of Letters Patent. Patented Dec. 17, 1912.

Application filed June 17, 1912. Serial No. 704,098.

*To all whom it may concern:*

Be it known that I, EDWARD O. CLARK, a citizen of the United States of America, residing at Spokane, in the county of Spokane and State of Washington, have invented certain new and useful Improvements in Automobile-Headlights, of which the following is a specification.

This invention relates to automobile headlights and one of the principal objects of the invention is to provide means of simple construction which will automatically throw the light in front of the vehicle in turning curves or corners and which can be readily thrown out of operation when not required for use.

Another object of the invention is to provide an automatically operating headlight attachment for automobiles and other vehicles which will turn with the front wheels in rounding corners or curves and which can be readily thrown out of operation during the daytime, which will be comparatively simple in construction, efficient in operation and readily attachable to well known types of automobiles and similar vehicles.

Figure 1:
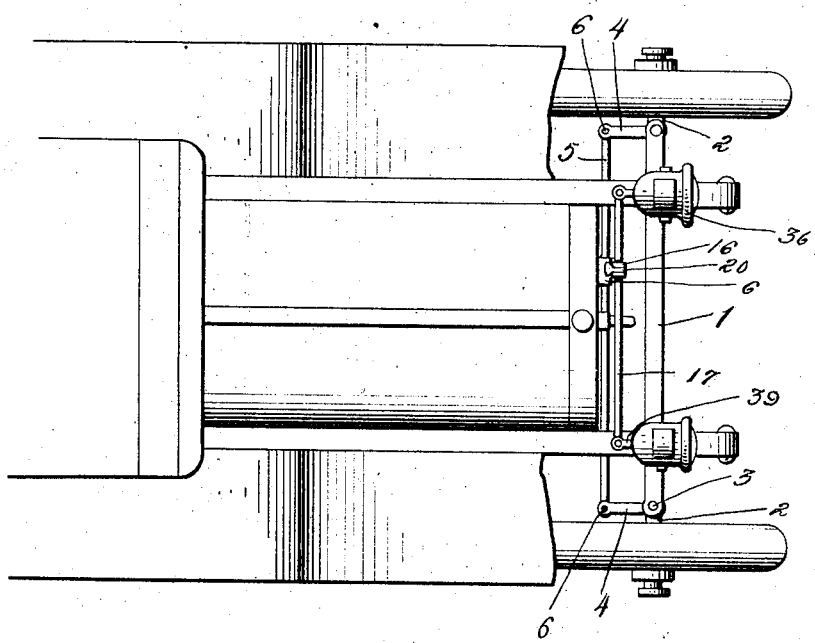
Figure 2:
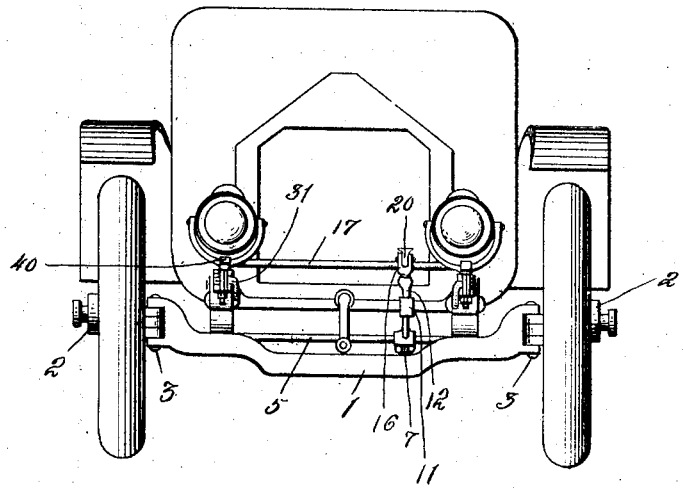

These and other objects may be attained by means of the construction illustrated in the accompanying drawings, in which:

Figure 1 is a top plan view of an automobile headlight attachment made in accordance with my invention and in which the reach rod for operating the lamps is placed in rear of the axle, a portion of the guards being broken away to better illustrate the construction of the attachment; Fig. 2 is a front elevation of the same; Fig. 3 is a top plan view similar to that shown in Fig. 1 in which the reach rod is attached in front of the axle; Fig. 4 is a detail perspective view showing one of the lamps and the manner of attaching and operating the same; Fig. 5 is a detail elevation of the locking mechanism for holding the lamps stationary or permitting them to swing to throw the light in front of the vehicle; Fig. 6 is a view in elevation and partial section of the lamp bracket and connecting parts; Fig. 7 is a sectional view of the locking sleeve showing the locking lever in locked position; and Fig. 8 is a detail sectional view taken on the line 8—8 of Fig. 7.

Referring to Figs. 1, 2 and 4, of the drawings, the numeral 1 designates the axle of the automobile, 2 the wheel spindles pivoted at 3 to the axle, said spindles having an angular arm 4 extending rearward from the axle, said angular arms being connected together by means of a rod 5 pivoted at 6$^x$ to said arms. Mounted on the connecting rod 5 is a clamp 6 provided with a binding screw 7 by means of which the clamp 6 may be moved upon the rod 5 and held in adjusted position. Connected to the clamp 6 is a bracket comprising a vertical member 8 and a horizontal forwardly extending arm 9. The front end of the arm 9 is pivoted at 10 to a sleeve 11 mounted on a shank 12 having at its upper end a socket 13 to accommodate a ball member 14 formed on a shank 15 extending downward from a sliding sleeve 16 mounted upon a reach rod 17. The reach rod 17 is provided with two or more notches 18 and pivotally connected to the sleeve 16, on a pin 19, is a locking lever 20, said locking lever being mounted in a slot 21 in a sleeve 16. Surrounding the pivotal pin 19 is a spring 22 which normally holds the lever 20 in unlocked position with its curved lower edge 23 out of engagement with the notches 18. For holding the lever in locked position, I have provided a spring actuated pin 24 mounted in the sleeve and having a spring 25 surrounding the same and seated in a socket in one side of the slot 21, said pin having a normally projected curved end 26 which engages a recess 27 in the side of the lever 20. Bolted at 27 to the front member of the chassis 28 is a bracket 29, one upon each side of the machine. The bracket 29 is provided with a sleeve 30 forming a clamp and a lever 31 is mounted in the clamp for holding the shank 32 pivotally within it. On the lower end of the shank 32 a nut 33 and a spring washer 34 are mounted. Above the shank 32 is a yoke 35 between the members of which the lamp 36 is pivotally mounted at 37. Pivotally connected at each end of the rod 17 at 38 is a bar or lever 39 the front end 40 of which is bent downward to engage the lamp bracket and is held in place by means of a binding screw 41.

Referring to Fig. 3, of the drawings, the reach rod 17$^a$ is disposed in front of the axle instead of the rear as shown in the other views and the arms 4$^a$ on the wheel spindles 2ᵃ project forwardly and are connected by the rod 5ᵃ. The remaining construction is substantially identical with that already described and is provided with the locking mechanism referred to.

The operation of my invention may be briefly described as follows: When it is desired to have the lamps turn to throw the light in front of the vehicle in rounding corners or curves, the locking lever 20 is thrown downward and locked by the pin 24 in one of the notches 18 in the rod 17. As the wheels turn to either side, the lamps are automatically turned to cast the light in front of the vehicle. Whenever it is desired to turn the vehicle without operating the lights, as in the day-time, the lever is disconnected from the notch 18 by pressing downward upon the projecting end of the lever, the spring 22 serving to hold the lever in this condition and permitting the rod 17 to move through the sleeve freely and thus render the lights stationary.

My invention is of comparatively simple construction, can be readily attached to automobiles and can be manufactured at comparatively low cost.

I claim:

A headlight operating mechanism for vehicles comprising wheel spindles pivoted to an axle and each provided with an extending arm, a rod pivotally connected to said arm, a sleeve mounted on said rod, a bracket connected to said sleeve, a collar pivoted to said bracket, a shank mounted in said collar and provided with a socket at its upper end, a ball mounted in the socket, a locking sleeve on the ball member, a lever pivoted in said sleeve, a reach rod provided with notches extending through said sleeve, lamp brackets pivotally mounted on the vehicle and connecting bars pivoted to said reach rod and engaging said lamp brackets.

In testimony whereof I affix my signature in presence of two witnesses.

EDWARD O. CLARK.

Witnesses:
E. A. MOYE,
T. F. KILBY.

---

Copies of this patent may be obtained for five cents each, by addressing the "Commissioner of Patents, Washington, D. C."